Dec. 6, 1927.
R. L. GREEN
SAFETY CRANKING DEVICE
Filed Feb. 17, 1927
1,651,695
2 Sheets-Sheet 2
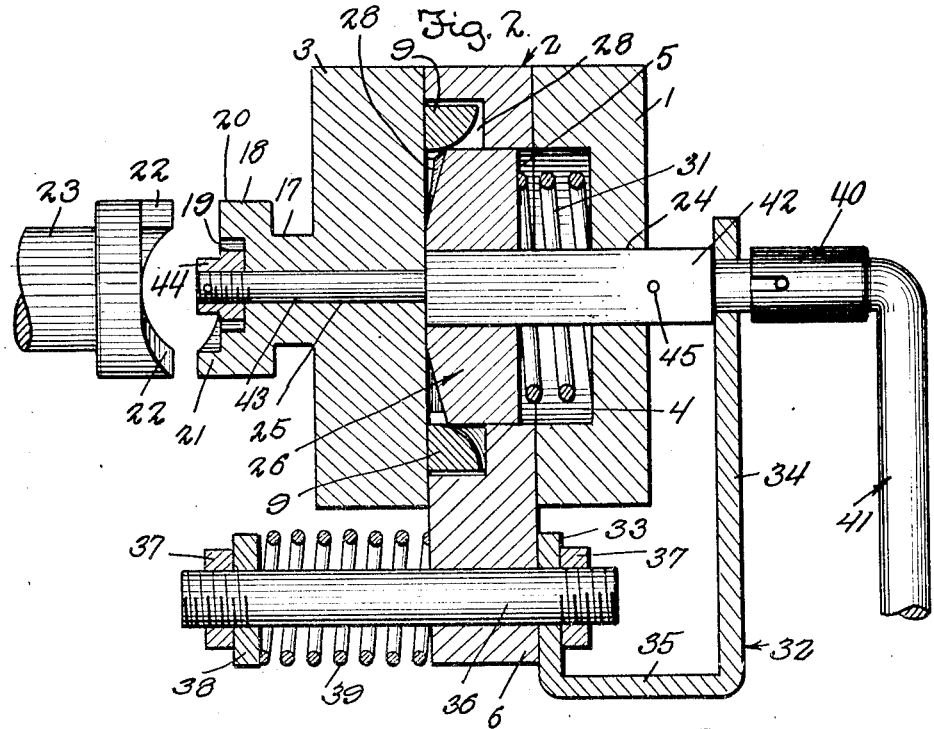
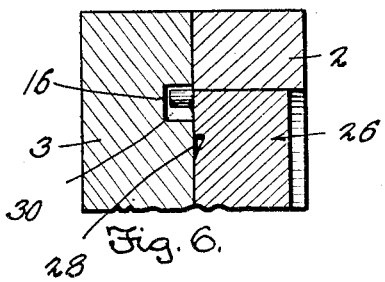
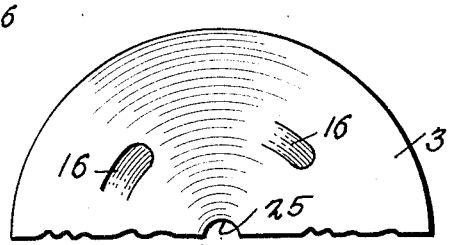
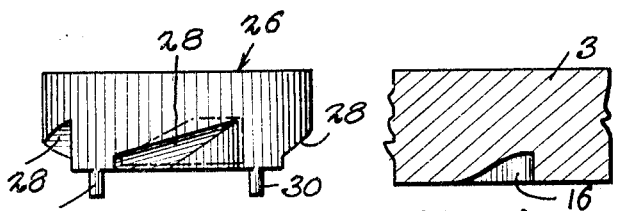
Royal L. Green, Inventor Patented Dec. 6, 1927.

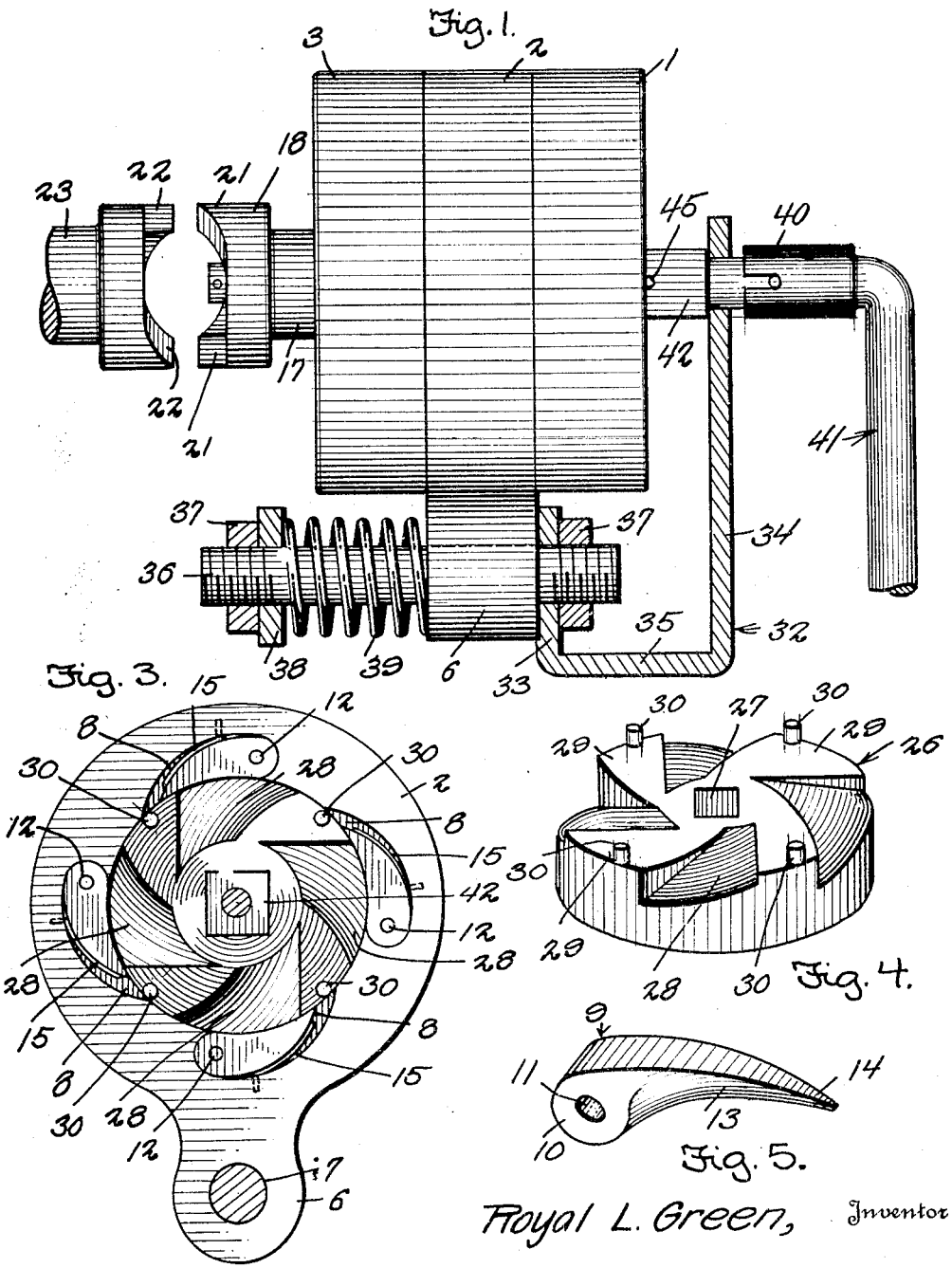

1,651,695

UNITED STATES PATENT OFFICE.

ROYAL L. GREEN, OF GREENVILLE, SOUTH CAROLINA.

SAFETY CRANKING DEVICE.

Application filed February 17, 1927. Serial No. 169,060.

This invention relates to a starting crank structure designed particularly for use upon automobiles and relates to a means for preventing injury to one when cranking the machine by hand, in the event of a back fire.

The primary object of this invention is to provide in a manner as hereinafter set forth, an automobile starting crank having means associated therewith for bringing about the quick release of the crank by the engine crank shaft so that the starting crank will not be spun in the reverse direction and thereby possibly injure the person cranking the machine.

Another object of this invention is to provide, in a manner as hereinafter set forth, a machine cranking device which will be of sufficient strength to withstand sudden and violent strains, of easy operation, and comparatively inexpensive to manufacture, set up and install.

Numerous other objects and advantages of this invention will become apparent as the description of the same proceeds, and the invention will be best understood from a consideration of the following detailed description taken in connection with the accompanying drawings forming a part of this specification, with the understanding, however, that the invention is not confined to any strict conformity with the showing of the drawings, but may be changed or modified so long as such changes or modifications mark no material departure from the salient features of the invention as expressed in the appended claims.

In the drawings:

Figure 1 shows the device embodying this invention, in side elevation.

Figure 2 is a vertical, central longitudinal section of the device.

Figure 3 is a front elevation of one of the sections of the device.

Figure 4 is a detailed perspective view of the rotary releasing element.

Figure 5 is a perspective view of a releasing finger.

Figure 6 is a detailed sectional view showing the relation between the rotary releasing element and the inner section of the device.

Figure 7 is an elevational view of the upper portion of the inner face of the inner section.

Figure 8 is a view looking toward the tapered end of the releasing finger shown in Figure 5.

Figure 9 is an edge view of the rotary releasing element.

Figure 10 is a sectional view through a portion of the inner element of the device showing the contour of one of the recesses formed upon the inner face thereof.

Referring now to the drawings in detail, wherein like numerals of reference indicate corresponding parts throughout the several views, the structure embodying this invention comprises an outer, intermediate, and inner member 1, 2 and 3, respectively, the outer member 1 having a circular recess 4 formed in the inner face thereof while the member 2 is of annular form, the opening 5 therethrough being of substantially the same diameter as the recess 4 in the outer member.

This intermediate member 2 has extending therefrom an ear 6 through which an aperture 7 is formed and in that face of this member 2 there is formed a plurality of equidistantly spaced pockets 8 each of which opens through the inner wall into the opening 5 as shown in Figures 2 and 3. The inner wall of each pocket 8 is of curved formation as shown in Figure 3 thus making the pockets of gradually decreasing width.

In each of the pockets 8 a releasing finger, indicated generally by the numeral 9 is pivotally mounted. Each of these fingers 9 has a stock portion 10 provided with an aperture 11 through which a securing pin 12 is passed, the stock portion occupying that part of the pocket of greatest width.

Each of these fingers 9 is of curved configuration, following generally the curvature of the inner wall of the pocket in which it is positioned and the under face of each finger is cut away as indicated at 13 forming a cam surface and causing the finger to be tapered to a point as indicated at 14. The cut away portion 13 of each finger lies against the side wall of its respective pocket, thus presenting the broad side of the finger to the opposed face of the inner section 3.

In the inner wall of each of the pockets 8 one end of a spring tongue 15 is engaged the major portion of the spring bearing against the opposed back of the finger normally urging the same outwardly.

The inner member 3 has the inner face thereof, or that face against which the intermediate portion bears, provided with an annular series of curved pockets 16, which pockets are flush at one end with the surface of the member and gradually increase in depth throughout their length, in a clockwise direction. The number of pockets 16 here shown are four corresponding to the number of the fingers 9. The circle described by the pockets 16 is of less diameter than the diameter of the opening 5 formed through the intermediate member 2.

The inner face of the inner member 3 is provided with a centrally located extension 17 terminating in a head 18 provided with a central recess 19 and having the annular flange 20 thus formed provided with a plurality of clutch teeth 21. These clutch teeth are designed to engage similarly formed clutch teeth 22 upon the adjacent opposed end of an engine crank shaft 23.

The outer member 1 of the device has formed through the center thereof the square aperture 24 while the inner member 3 has formed through the diametrical center a passage 25 which extends through the extension 17 and opens into the recess 19.

Snugly fitted in the opening 5 of the intermediate member 2 is a rotary disc releasing element indicated generally by the numeral 26. This element 26 has a square opening 27 formed through the diametrically center thereof which aligns with the opening 24 formed in the outer member 1. The inner face of the element 26, or that face opposing the recessed face of the inner member 3 is cut away to form a plurality of cam faces 28, here shown as four in number and corresponding to the number of releasing fingers 9 employed in the device. Those portions 29 of the inner face of this element lying between the cam surfaces 28 are each provided with a pin 30, which pins form a circular series, the circle described thereby corresponding in diameter to a circle described by the series of recesses 16 formed in the opposed face of the member 3, so that the pins may ride into these recesses when the device is operated.

Positioned behind the element 26 and in the recess 4 of the member 1 is a coil spring 31 which only acts to push the member 26 toward the member 3.

Associated with this structure is a substantially J-shaped bracket indicated generally by the numeral 32 and comprising the upright arms 33 and 34 connected by the cross portion 35. The arm 33, or short arm, has an aperture formed therethrough for the reception of one end of a bolt 36, each end of which bolt is provided with screw threads to receive the nuts 37, one of these nuts being threaded upon that end of the bolt which passes through the arm 33, to clamp the bolt against the ear 6 of the member 2 through the aperture 7 through which it passes. The other end of the bolt 36 extends beneath the inner portion 3 of the device and carries thereon inwardly of the nut 37, the washer 38 and surrounding the bolt and interposed between this washer and the adjacent face of the ear 6 is a coil spring 39, which normally urges the ear 6 against the leg 33.

The free end of the arm 34 of the bracket 32 is designed to extend across the opening 24 of the member 1 and is provided in alignment with this opening, with an aperture to receive the portion 40 of the crank 41. The inner end of the portion 40 of the crank is provided with a square shaft 42 which extends through the opening 24 and the passage 27 of the element 26, abutting at its inner end the inner face of the member 3. From the inner end of this square shaft 42 there extends the round shaft 43 which passes through the passage 25 of the inner member projecting into the recess 19 where it receives a head in the form of a nut 44. From the foregoing description and the showing of Figure 2 it will be readily seen that the members 1, 2 and 3 are held closely together, a suitable pin 45 being passed through the square shaft 42 to overlie the outer face of the member 1, for this purpose.

In operation, the bracket 32 is appropriately mounted upon the machine to align the shafts 42 and 43 with the machine crank shaft 23, the spring 39 normally holding the structure in such manner as to maintain the clutch teeth 21 free from contact with the teeth 22 upon the crank shaft.

In cranking, the crank is forced inwardly in the usual manner until the clutch 21 and 22 engage, this operation compressing the spring 39, all three of the sections of the device moving inwardly. If the pins 30 are not already engaged in the recesses 16, the turning of the crank will revolve the member 26 until such engagement occurs it of course being understood that the spring 31 forces the member 26 into this engagement. The cranking motion is then transmitted to the portion 3 of the device through the connection of this member 26 therewith.

In the event of a back fire while the parts are in the position just described, the section 3 will be reversely rotated causing a slight reverse rotation of the element 26. When this occurs the spring pressed fingers 9 will be forced downwardly onto the cam surfaces 28 of the member 26 causing this member 26 to be forced outwardly against the tension of the spring 31, by the cam faces 13 of the fingers riding upon the cam faces 28, thus withdrawing the pins 30 from the recesses 16 in which they are engaged. This allows free rotation of the portion 3 with the crank shaft, until the crank is released to permit the spring 39 to retrack the entire structure.

Having thus described my invention, what I claim is:

1. An automobile engine cranking element, comprising a hand crank member shaft, means for shiftably supporting the same in alignment with an engine crank shaft, an engine crank shaft engaging element carried rotatively on said member, means longitudinally shiftable on and mounted to rotate with the member for engagement with said element to connect the element and hand crank member together, and means for breaking the connection between said shiftable means and member, upon the reversal of the rotary movement of the member, to prevent reverse rotation of the crank.

2. An automobile engine cranking element, comprising an unbroken hand crank member shaft, means for shiftably supporting the same in alignment with an engine crank shaft, an engine crank shaft engaging element carried rotatively on said member, means longitudinally shiftable on and mounted to rotate with the member for engagement with said element to connect the element and crank member together, means for breaking the connection between said shiftable means and member, upon the reversal of the rotary movement of the engine shaft engaging element, to prevent reverse rotation of the hand crank, and means carried by the crank member normally urging said longitudinally shiftable means into operative engagement with the engine shaft engaging element.

3. A crank member having one section thereof arranged in alignment with an engine crank shaft and comprising a portion of circular cross section and a portion of square cross section, a plate member centrally traversed by the portion of circular cross section and rotatable thereon, means carried by said plate for connection with an adjacent end of the engine crank shaft, an annular member traversed by the portion of square cross section and bearing against one face of the plate, a disc element within said annular element and slidably mounted on the square portion to turn therewith, pin elements projecting from said disc to engage in recesses formed in the adjacent plate, and means carried by the annular member becoming active upon reversal of the rotary movement of said plate and disc members whereby said disc will be shifted upon the supporting crank portion to disengage said pins from the plate.

4. A crank member having one section thereof arranged in alignment with an engine crank shaft and comprising a portion of circular cross section and a portion of square cross section, a plate member centrally traversed by the portion of circular cross section and rotatable thereon, means carried by said plate for connection with an adjacent end of the engine crank shaft, an annular member traversed by the portion of square cross section and bearing against one face of the plate, a disc element within said annular element and slidably mounted on the square portion to turn therewith, pin elements projecting from said disc to engage in recesses formed in the adjacent plate, means carried by the annular member becoming active upon reversal of the rotary movement of said plate and disc members whereby said disc will be shifted upon the supporting crank portion to disengage said pins from the plate, and means, compressed upon movement of the cranking element to active position, whereby the entire cranking element will be shifted to inactive position upon release of the crank.

5. A crank member having one section thereof arranged in alignment with an engine crank shaft and comprising a portion of circular cross section and a portion of square cross section, a plate member centrally traversed by the portion of circular cross section and rotatable thereon, means carried by said plate for connection with an adjacent end of the engine crank shaft, an annular member traversed by the portion of square cross section and bearing against one face of the plate, a disc element within said annular element and slidably mounted on the square portion to turn therewith, said disc having the plate opposed face cut away to form a plurality of cam surfaces and said annular element having the plate opposed face formed to set up a plurality of recesses each also opening toward the periphery of the disc, a pin element in each portion of the disc face lying between the cam surfaces each designed to engage in a recess in the opposed plate, and a finger element pivotally mounted in each of said annular member recesses designed to engage one of the cam surfaces of the disc, upon reversed rotary movement of said plate and disc, whereby to force said disc away from the plate to withdraw the pins from engagement therewith.

6. A crank member having one section thereof arranged in alignment with an engine crank shaft and comprising a portion of circular cross section and a portion of square cross section, a plate member centrally traversed by the portion of circular cross section and rotatable thereon, means carried by said plate for connection with an adjacent end of the engine crank shaft, an annular member traversed by the portion of square cross section and bearing against one face of the plate, a disc element within said annular element and slidably mounted on the square portion to turn therewith, said disc having the plate opposed face cut away to form a plurality of cam surfaces and said annular element having the plate opposed face formed to set up a plurality of recesses each also opening toward the periphery of the disc, a pin element in each portion of the disc face lying between the cam surfaces each designed to engage in a recess in the opposed plate, and a finger element pivotally mounted in each of said annular member recesses designed to engage one of the cam surfaces of the disc, upon reversed rotary movement of said plate and disc, whereby to force said disc away from the plate to withdraw the pins from engagement therewith, and a resilient element normally acting against said disc to force the same toward said plate member.

7. An automobile cranking device, comprising a crank member having one section thereof arranged in alignment with an engine crank shaft and comprising a portion of circular cross section and a portion of square cross section, means centrally transversed by the portion of circular cross section and rotatable thereon for engaging the end of an adjacent engine shaft, an annular member transversed by the portion of square cross section and bearing against the face of the first mentioned means for setting up engagement between the same and the crank member, and means carried by the annular member designed to become active upon reversal of the rotary movement of said first means to bring about the disengagement of the crank member and the engine shaft engaging member carried thereby.

8. A safety cranking device for internal combustion engines, comprising a crank member having a shaft provided with a portion of circular cross section design and a portion of polygonal sectional design and adapted to be arranged in alignment with an engine shaft, an engine shaft engaging member carried and freely rotatable upon said portion of circular cross section, a shiftable body mounted upon said portion of polygonal cross section, means carried by said shiftable body for engaging the adjacent face of the engine shaft engaging member, and cam elements pivotally mounted adjacent said engine shaft engaging member and designed, upon the reverse rotation of said member and the engaged shiftable body, to move said body longitudinally of the supporting polygonal section, substantially and for the purpose described.

In testimony whereof I affix my signature.

ROYAL L. GREEN.